J. H. WATTLES.
Tables.

No. 138,718. Patented May 6, 1873.

Witnesses:
J. T. Thomas
Alex Mahon

Inventor
Jervis H. Wattles
by A. M. Smith
Attorney

AM. PHOTO-LITHOGRAPHIC CO. N.Y. (OSBORNE'S PROCESS.)

UNITED STATES PATENT OFFICE.

JERVIS H. WATTLES, OF BATTLE CREEK, MICHIGAN.

IMPROVEMENT IN TABLES.

Specification forming part of Letters Patent No. 138,718, dated May 6, 1873; application filed April 12, 1873.

*To all whom it may concern:*

Be it known that I, JERVIS H. WATTLES, of Battle Creek, county of Calhoun, State of Michigan, have invented certain new and useful Improvements in Tables or Table-Leg Attachment, of which the following is a full, clear, and exact description, reference being had to the accompanying drawing making part of this specification, in which—

Figure 1:
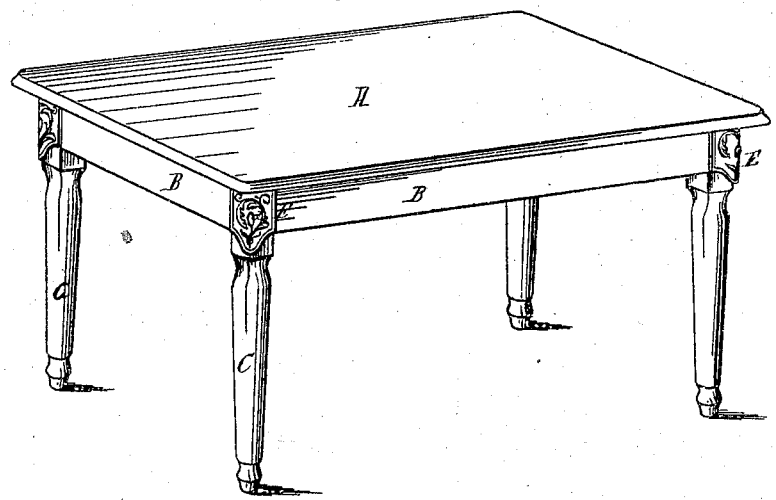
Figure 2:
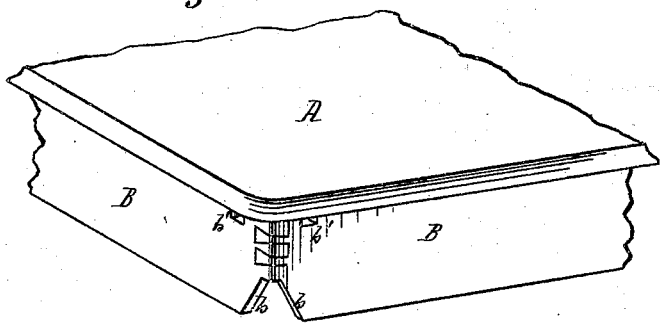
Figure 3:
Figure 4:
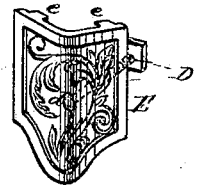

Figure 1 is a perspective view of a table with my improvements applied. Fig. 2 is a partial section of a table with clamp and leg removed. Fig. 3 is a perspective view of the leg, and Fig. 4 is a perspective view of the clamp detached.

Similar letters of reference denote corresponding parts in all the figures.

My invention has for its object the construction of a removable leg which can be applied to all classes of furniture, not only without weakening it or being at all liable to become loose in use, but so united therewith as practically to become more firmly united by use, and at the same time increasing its strength and durability, as well as the facility of transportation. The construction and arrangement of parts will be more fully understood with reference to the drawing, in which—

A represents the bed of the table, which may be made in any desired form; and B B, the side and end rails. These rails may be connected in any usual or desired manner. The ends of these rails are beveled at the lower corner, as shown at $b$. C are the legs, cut away on their front faces at the top, as shown at $c$, conforming to the beveled faces of the rail. The legs are provided with a perforation diagonally across it, which, when the leg is in position, is in line with the perforation formed in the clamp or binder. The beveled edges or shoulders of the leg form a support upon which the faces of the beveled edges or ends of the rail rest. The inner portion of the leg fits inside, and is inclosed by the ends of the rails. E is a clamp or binder, which extends a short distance on both the rails, and covers the joints or points of connection of the two rails with each other and their connection with the legs. The clamp or binder is provided upon its inner face, near the top, with projecting lugs $e$ $e$, cast with it, which fit into notches in the rails B B, as shown at $b'$ $b'$; or it may be provided with a projecting lip or flange in the center, which fits into a groove cut across the two rails where they intersect each other. This clamp is perforated to receive the bolt D, which passes through the clamp E and leg C, and is secured by a nut which is screwed up thereon; or, if preferred, the nut may be made stationary in the leg, and the bolt itself turned up and thus made to firmly secure the parts in place. The face of the clamp may be ornamented in any desired manner, and the head of the bolt which projects on its face may form, when inserted, a portion of the ornamentation of the metal clamp or corner.

By my construction it will be seen that the clamp may be made not only to form an ornamental corner for furniture, but also serves, in connection with the screw and nut, to bind and hold the parts firmly together.

Having thus described my invention, what I claim as new, and desire to secure by Letters Patent, is—

1. The removable leg C, provided with the beveled shoulders $c$ $c$, in combination with the beveled ends or corners of the end and side rails, substantially as described.

2. The combination of the corner-clamp E, through bolt D and nut, with the removable leg C, for clamping said leg to the rails, substantially as described.

JERVIS H. WATTLES.

Witnesses:
JOSEPH G. HOYT,
W. A. KELLOGG.